United States Patent [19]

Endo et al.

[11] Patent Number: 5,322,650
[45] Date of Patent: Jun. 21, 1994

[54] METHOD AND APPARATUS FOR PRODUCING FIBERS

[75] Inventors: Shigeo Endo; Haruo Kawashima, both of Narita; Kimio Hirata, Kazaki; Yasuo Misu, Narita; Akira Itoh, Chiba, all of Japan

[73] Assignee: Toshiba Monofrax Co., Ltd., Tokyo, Japan

[21] Appl. No.: 851,423

[22] Filed: Mar. 13, 1992

[30] Foreign Application Priority Data

Mar. 13, 1991 [JP] Japan .................. 3-126966
May 15, 1991 [JP] Japan .................. 3-205005

[51] Int. Cl.$^5$ .............................................. B05B 17/00
[52] U.S. Cl. ................................................ 264/11; 425/7
[58] Field of Search .................. 264/11; 425/7; 65/5, 65/16; 75/337; 501/95, 128

[56] References Cited

U.S. PATENT DOCUMENTS

| | | |
|---|---|---|
| 3,449,137 | 6/1969 | Ekdahl . |
| 4,060,355 | 11/1977 | Walz et al. .................. 425/7 |
| 4,185,981 | 1/1980 | Ohsato et al. .................. 65/5 |
| 4,230,471 | 10/1980 | Levecque et al. .................. 65/2 |
| 4,316,731 | 2/1982 | Lin et al. .................. 65/5 |
| 4,374,645 | 2/1983 | Monteyne .................. 264/11 |

FOREIGN PATENT DOCUMENTS

| | | | |
|---|---|---|---|
| 0126767 | 4/1985 | European Pat. Off. . | |
| 429554 | 5/1926 | Fed. Rep. of Germany . | |
| 1942991 | 4/1972 | Fed. Rep. of Germany . | |
| 1966255 | 4/1974 | Fed. Rep. of Germany . | |
| 1302045 | 7/1962 | France .................. | 264/11 |
| 2480136 | 10/1981 | France .................. | 264/11 |
| 59-92951 | 5/1984 | Japan .................. | 264/11 |
| 11303 | of 1887 | United Kingdom .................. | 65/5 |

Primary Examiner—Mary Lynn Theisen
Attorney, Agent, or Firm—R. Lawrence Sahr

[57] ABSTRACT

A molten fiber material flow is rendered into a plurality of fibers by means of a liquid jet such as water jet in place of a pressurized gas or air. The flow moves downwardly in a vertical direction while the water jet cuts it at an inclined angle. The water jet is formed by a single nozzle or plural nozzles of a flat-jet or round-jet type.

15 Claims, 2 Drawing Sheets

METHOD AND APPARATUS FOR PRODUCING FIBERS

FIELD OF THE INVENTION

This invention relates to a method and apparatus for producing fibers by applying a fluid to a fused or molten fiber material.

BACKGROUND OF THE INVENTION

Well-known examples of an inorganic amorphous fiber material are: slags discharged from various glass furnaces and blast furnaces; basic rocks such as basalt; clay minerals such as Kaolin; and mixtures of Bayer process alumina with quartz sand or silica sand.

Such inorganic amorphous fiber materials are discharged continuously from a cupola or electric furnace through its tap hole in the form of a fine flow and then elongated by means of an outer force such as an air jet so as to make fibers. Three typical fiber-producing methods are:

(A) a drawing method by which continuous glass fibers are produced by drawing a fiber material continuously from a nozzle;

(B) a throwing method or a spinning method by which fibers are produced by centrifugal force of a spinner which is a rotation disc for making fibers; and (C) a blowing method by which fibers are produced by a gas flow such as an air jet at a high speed.

According to a conventional blowing method, a pressurized gas such as air is jetted out through nozzle so as to obtain a flow speed near sonic velocity. A molten fiber material flow is guided into such a gas flow so as to produce fine fibers by means of the gas jet's impact on the molten fiber material flow.

The conventional blowing method has at least three defects.

A first defect is that a very large energy is required in order to compress air for jetting purposes. For example, in case $Al_2O_3$—$SiO_2$ ceramic fibers are produced, a molten fiber material flow is discharged from a melting furnace at a flow rate of 400 kg/hr, while an air pressure of several kilograms per $cm^2$ is applied. In order to produce such an air pressure, the air compressor must have about 300 horsepower (255 kw). Therefore, the energy necessary for making fibers is 255 kwh/400 kg=0.64 kwh/kg. In comparison with this energy, the energy necessary for fusing an $Al_2O_3$—$SiO_2$ material is about 1.8 kwh/kg. Thus, the fiber-making energy is not small.

A second defect of the conventional blowing method is to need a means for collecting fibers. Jet air flowing at a high speed near sonic velocity induces some ambient air into the collecting chamber so that the volume of air to be discharged from the collecting chamber is several times as large as that of the jet air. If the discharging capacity is small, the pressure in the collecting chamber becomes larger than that of the atmosphere so that some fibers may be discharged out of the collecing chamber. In such a case, a large filter device must be provided so as to separate the fibers from the air. Also, a dust collector must be provided so as to keep the ambient atmosphere clean. Therefore, the cost of equipment and operation thereof is large. For example, the electric power required for operating the filter device and the dust collector is 0.5 kwh/kg in total.

A third defect of the conventional blowing method is that the rate of making fibers is low. Some shots is produced in fibers so as to adversely affect the otherwise low heat conductivity of the ceramic fibers functioning as a heat insulating material.

SUMMARY OF THE INVENTION

The object of this invention is to provide an improvement over the blowing method and apparatus for making fibers.

According to this invention, a molten fiber material is shaped into a plurality of fibers by means of a liquid jet in place of a pressurized gas or air jet. A preferred example of the liquid is water or any combination of water with any other compatible substance in a dissolved or suspended condition.

According to a preferred embodiment of this invention, while a thermally molten fiber material continuously falls downwardly in the form of a fine flow, a water jet is applied onto the molten fiber material flow so as to cut it. The water jet moves at a high speed so that a very large impact or pressure can be applied onto molten fiber material. Preferred machines for producing water jet are jet cleaners, aqua jet cutters or the like produced by Sugino Machine Limited in Japan. Those comprise a compressor for pressurizing water and a nozzle for jetting it.

An engine for actuating the compressor preferably has a horsepower of 20 to 150 for producing a pressurized liquid so that the working pressure ranges from 55 to 4,000 $kgf/cm^2$ and the discharge capacity ranges from 10 to 390 l/min. The engine output is preferably 50% or less when the compressor is actuated, so as to produce an average liquid pressure of 100 to 2,000 $kgf/cm^2$ at an average flow speed of 15 to 100 l/min.

A water jet can be produced by a single nozzle, but it is preferable to use at least two nozzles. In the case of a single nozzle, the water jet is preferably arranged so as to cut the fine molten fiber material flow at an angle of 10 to 90 degrees in respect to the axis of the nozzle. It is also preferable that plural water jets from plural nozzles are arranged so as to cross at an interconnecting point at an angle of 30 to 65 degrees with respect to the axis of each nozzle where a fine molten fiber material flow falls downwardly in a vertical direction at a flow speed of 75 to 500 kg/hr. The molten fiber material flow is shaped into a plurality of fibers by means of the water jets. The fibers fall downwardly. At that time, they are cooled.

A water tank is positioned under the nozzles for collecting the fibers together with the water in a collecting chamber therein. The fibers may be temporarily stored together with the water.

The collected fibers are dehydrated and then dried. If desired, they are treated by a paper machine before being dehydrated and dried. Shot contained in the fibers may be separated therefrom. Any other steps can be added after and/or before the dehydrating and drying steps.

According to this invention, two types of nozzles can be used for forming a water jet. In one type of nozzle, which is called a round-jet nozzle, the water jet discharged from the nozzle does not diverge to a large degree. For example, the shape of a cross section of such a nozzle may be a circle, an ellipse, a rectangle or a combination thereof. In case of a circular round-jet nozzle, its diameter preferably ranges from 0.5 mm to 3 mm.

In the other type of nozzle, which is called a flat-jet nozzle, the water jet diverges gradually from a discharging point of the nozzle only along a direction but not any direction perpendicular to the nozzle. This type jet nozzle has a shallow groove extending along a straight line on a discharge surface at a right angle to the axis of the nozzle. The shallow groove in the discharge surface is connected at a central portion thereof to a through-hole having a circular cross-section the diameter of which is from 0.5 mm to 3 mm. The shallow groove has a V-shaped section in its depth direction so as to diverge from its sides, outwardly toward the circular cross-section at an angle of 15 to 35 degrees. The shallow groove has a width of 0.5 mm to 3 mm side to side, and a length of 2 mm to 6 mm end to end. A deeper widening groove is joined to the shallow groove so as to extend and connect the circular cross-section to deeper widening the shallow groove. The groove is gradually tapered outwardly to reach an outer side portion of the nozzle shallow groove. For example, the bottom of the deeper widening groove has a width of 3 to 6 mm and extends from the opposite ends of the shallow groove to the outer side portion of the circular cross-section at an inclined angle of 30 to 60 degrees.

In comparison with gas (air), a liquid can be easily pressurized, and its density is large. The density of water is about 800 times as large as that of air. Thus, kinetic energy or external force can be applied onto a molten fiber material with a higher efficiency. Also, the energy of pressuring the liquid is relatively very small so that a compressor can be small in size. It is easy to form a liquid jet flowing at a speed higher than sonic speed. A pressurized liquid flow does not induce ambient atmosphere air to any significant degree.

All of the produced fibers may move into a liquid chamber together with the jet liquid. No fiber dust problem occurs. Therefore, it is not necessary to provide any fiber and/or dust collector, an air filter or the like.

A water jet can have excellent convergence. Even a fine water jet can have reasonable impact upon a molten fiber material In particular, a high energy density can be obtained in the form of a fine water jet if it is applied under a high-pressure and at a high-speed. In this case, the volume of water to be consumed is small.

A strong impact of the water jet can produce extremely fine fibers so that the volume of shot can decrease while the size thereof can become small.

DETAILED DESCRIPTION OF THE EMBODIMENTS

Figure 1:
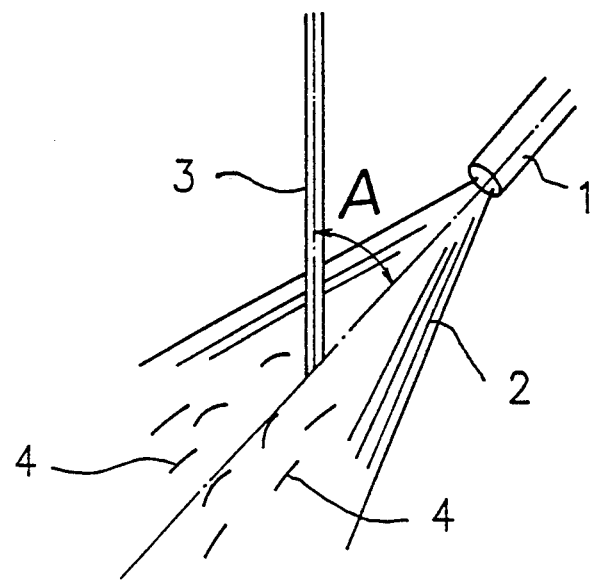
FIG. 1 is a perspective view schematically showing an apparatus for making fibers according to a first embodiment of this invention.

FIG. 1 shows a first embodiment of this invention in which a single flat-jet nozzle 1 is used for producing a water jet 2 at a flow speed of 100 m/sec with a large energy. The water jet 2 has a flat diverging configuration. A thermally molten fiber material 3 continuously flows downwardly in the form of a fine line. The water jet 2 cuts the molten fiber material flow 3 at a predetermined inclined angle A so as to produce a plurality of fibers 4. Examples of the fiber material 3 are $Al_2O_3$—$SiO_2$ ceramic fiber compositions containing $Al_2O_3$, 35 to 65 weight %, $SiO_2$, 30 to 60 weight %, and minor impurities. Other examples of the fiber material 3 are $Al_2O_3$—$SiO_2$—$Cr_2O_3$ ceramic fiber compositions containing $Al_2O_3$, 35 to 65 weight %, $SiO_2$, 30 to 60 weight %, $Cr_2O_3$, 1 to 6 weight % and minor impurities.

The angle A between the water jet 2 and the molten flow 3 may include an acute angle at which the water jet 2 moves downwardly or an obtuse angle at which it moves upwardly. Preferably the angle A ranges between 10 degrees and 90 degrees. The best angle A is about 70 degrees. If the angle A is less than 10 degrees, the volume of produced fibers is small, and the shot becomes large in size.

Figure 2:
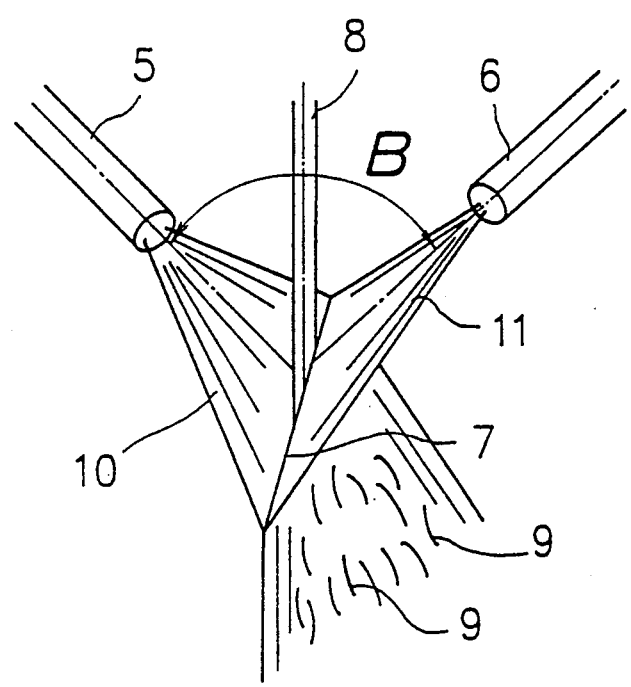
FIG. 2 is a perspective view schematically showing an apparatus for making fibers according to a second embodiment of this invention.

FIG. 2 shows a second embodiment of this invention. Two flat-jet nozzles 5, 6 are used for producing two flat water jets 10, 11 which cross along a line 7 where a thermally molten fiber material 8 flows downwardly, so as to produce a plurality of fibers 9. The water jets 10, 11 both have a similar flat diverging configurations. The fiber material 8 continuously flows downwardly in the form of a fine line. The water jets cut the molten fiber material flow 8. A downwardly converging inclined angle B between the two water jets 10, 11 preferably ranges between 10 degrees and 65 degrees. The best angle A is about 20 to 40 degrees. If the angle B is less than 10 degrees, the volume of produced fibers is small, and shot becomes large in size. If the angle B is more than 65 degrees, the volume of produced fibers becomes small although shots become small in size.

If two air jet nozzles are used in place of the water jet nozzles 5, 6, some air intermittently flows upwardly at an air-jet cross line so that some molten fiber material moves up. Therefore, fibers cannot be produced in a steady manner at a high production efficiency. In the case of water jets, fibers can be produced in a steady manner at a high production efficiency without such intermittent interruption.

Figure 3:
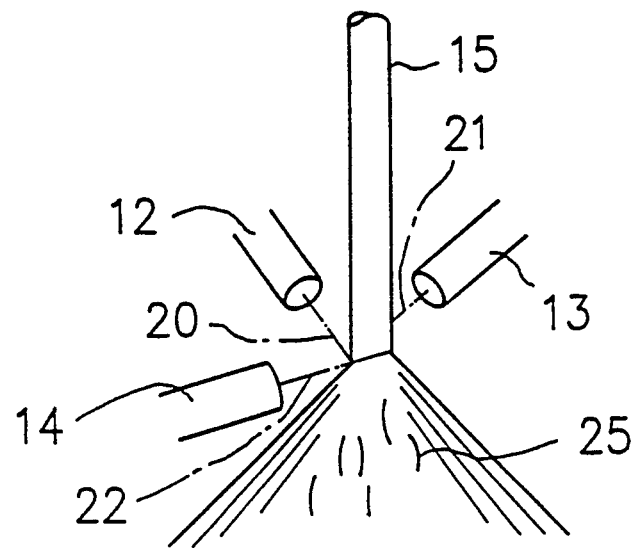
FIG. 3 is a perspective view schematically showing an apparatus for making fibers according to a third embodiment of this invention.
Figure 4:
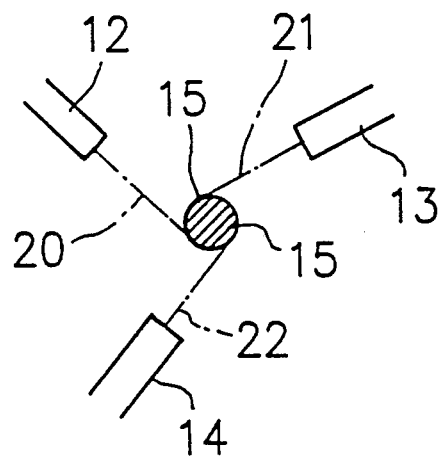
FIG. 4 is a schematic plan view, partly broken, showing the apparatus shown in FIG. 3.

FIGS. 3 and 4 show a third embodiment of this invention in which the number of round nozzles is three. In the illustrated embodiment, three round-jet nozzles 12, 13 and 14 are used for producing three water jets. A thermally molten fiber material 15 flows downwardly among the nozzles 12, 13 and 14. Each of the three water jets flows at a downwardly converging inclined angle so as to cut the molten fiber material flow 15. As best shown in FIG. 4, each water jet preferably forms a tangent which intersects an outer surface of the molten fiber material flow 15. Until the water jet cuts the molten fiber material flow so as to produce a plurality of fibers 25, the water jets move without significant diverging divergence.

It is apparent that four or more water jet nozzles can be arranged in such a manner.

It is possible that a water jet reasonably diverges and then cuts a molten fiber material.

In general, round-jet nozzles can be easily manufactured as fine nozzles, at least in comparison with flat-jet nozzles. A flow speed of water jets of some round-jet nozzles is three times as fast as that of the flat-jet nozzles so as to obtain a large energy density It is also advantageous that the volume of shot is decreased.

The fibers produced by the water jets usually contain a small amount of water. If desired, the fibers are separated from the water and then dried. However, during the steps of separating shot from the fibers, adjusting the length of the fibers and shaping the fibers into a felt or other various insulations, water is used as a carrier of those fibers. In such a case, it is not necessary to separate the water from the fibers.

This invention is not limited to the above-stated embodiments only. For example, any compatible liquid jet can be employed in place of a water jet with the water for the water jet containing as an additive agent, a polymer of acrylic amide, various high molecular weight agents for aiding water convergence, such as a polymer of ethylene oxide, fiber-treatment agents such as a lubricant, and/or various metal powder or various refractory powder such as $Al_2O_3$, $SiO_2$ and/or $Cr_2O_3$.

EXAMPLES 1 AND 2

A mixture of Bayer process alumina, 1 part by weight, and quartz sand, 1 part by weight, was fused in an arc furnace of 300 KVA so as to obtain a molten mixture. The molten mixture was vertically discharged through the orifice of a wafer placed at the bottom portion of a spout of the arc furnace. The wafer was made of BN (boron nitride) and had an opening with a diameter of 3 or 4 mm. In Example 1, the diameter of the opening was 4 mm, and the average flow rate of the molten mixture was about 150 kg/hr. In Example 2, the diameter of the opening was 3 mm, and the average flow rate of the molten mixture was about 75 kg/hr.

Water was pressurized by a compressor equipped with an engine of 150 horsepower, in particular, a model JCE-70085 jet cleaner produced by Sugino Machine Limited in Japan. The working pressure was 700 $kgf/cm^2$, and the discharge capacity was 72 l/min.

In Example 1, when the compressor was actuated, the engine output was 16%, and the average pressure was 500 $kgf/cm^2$, and the average water flow rate was 27 l/min. The total energy required for producing fibers was 24 horsepower, that is, 18 kwh. The required energy per 1 kg was 18 kwh/150 kg=0.12 kwh/kg.

In Example 2, when the compressor was actuated, the engine output was 4%, and the average pressure was 200 $kgf/cm^2$, and the average water flow rate was 17 l/min. The total energy required for producing fibers was 6.1 horse power, that is, 4.6 kwh. The required energy per 1 kg was 4.6 kwh/75 kg=0.06 kwh/kg.

In both Example 1 and Example 2, a flat water jet nozzle mounted to a spray gun employed. In particular, it was a model JNP-1021 flat-jet water jet nozzle for a gun produced by Sugino Machine Limited in Japan. In Example 1, two nozzles 5, 6 were arranged as shown in FIG. 2 in such a manner that two water jets 10, 11 moved downwardly and crossed at an angle B of 60 degrees. In Example 2, two nozzles 5, 6 were also arranged as shown in FIG. 2 in such a manner that two water jets 10, 11 moved downwardly and crossed at an angle B of 30 degrees. The molten fiber material 8 flowed vertically and reached the center of a cross line 7 of the two water jets 10, 11. At that time, the molten fiber material flow 8 was shaped into a plurality of fibers, by means of the water jets 10, 11, which then fell downwardly. The fibers were collected by a box type collector placed under the nozzles. A water tank was positioned in the bottom of the collector for receiving the fibers and the water therein. Next, the fibers were dehydrated and then dried.

Such produced bulk fibers were tested. Table 1 shows test conditions and test results.

EXAMPLE 3

In Example 3, like in Examples 1 and 2, a mixture of Bayer process alumina, 1 part by weight, and quartz sand, 1 part by weight was fused in an arc furnace so as to obtain a molten mixture. The molten mixture was vertically discharged through an orifice having an opening diameter of 4 mm. The average flow rate of the molten mixture was about 150 kg/hr. The compressor was the same as that of Examples 1 and 2. When the compressor was actuated, the engine output was 27%, and the average pressure was 700 $kgf/cm^2$, with the average water flow rate being 29.6 l/min. The total energy required for producing fibers was 40 horsepower, that is, 30 kwh. The required energy per 1 kg was 30 kwh/150 kg=0.2 kwh/kg.

As shown in FIG. 1, a single flat jet water jet nozzle 1 for a gun was arranged in such a manner that the water jet 2 moved downwardly at an angle A of 70 degrees. The molten fiber material flow 3 was rendered into a plurality of fibers 4, by means of the water jet 2, which then fell downwardly. The fibers 4 were collected by a water tank. After that, the fibers were dehydrated and then dried.

Such produced bulk fibers were tested. Table 2 shows test conditions and test results.

COMPARATIVE EXAMPLE

In a Comparative Example, a conventional blowing method was employed.

A fiber material was fused and vertically discharged through an orifice opening as a molten fiber material flow. A portable compressor equipped with an engine of 190 horsepower was used for producing pressurized air. The working pressure of the compressor was 7 $kgf/cm^2$, and the discharge volume was 19 $m^3$/min.

When the compressor was actuated, an engine output was 75% (143 horsepower), and with the average pressure was 5.2 $kgf/cm^2$, and with the average air flow rate being 19 $m^3$/min. The energy required for producing fibers per 1 kg was 107 kwh/150 kg=0.71 kwh/kg.

The molten fiber material flow was rendered into many fibers by an air nozzle, as disclosed in U.S. Pat. No. 3,476,324. A single air nozzle was arranged so as to blow pressurized air in a lateral direction so that the vertically flowing molten material and the horizontally blown air crossed at a right angle so as to produce a plurality of fibers.

The produced fibers were collected by a box type fiber collector. A metal net was arranged in the bottom portion of the fiber collector. A fan was placed under the net so as to suck the blown air at a flow rate of 100 $m^3$/min. The fibers were filtered by the net so that the air was separated from them and then discharged. The discharged air contained dust. In order to make the discharged air clean, the dust in the air had to be separated from the air by filtering it by means of a bag filter type dust catcher operating at 10 kwh.

Such produced bulk fibers were tested. Table 2 shows test conditions and test results.

Examples 1, 2 and 3 and the Comparative Example are explained by referring to Table 1 and Table 2.

The flow rate of liquid jet in the Example 1 was significantly smaller than that of the air jet of the Comparative Example. Also, the flow rate of each liquid jet in Examples 2 and 3 was significantly smaller than that of the air jet of the Comparative Example.

The required energy per 1 kg of Example 1 was about 1/6 of that of the Comparative Example. The required energy per 1 kg of Example 2 was about 1/10 of that of the Comparative Example The required energy per 1 kg of Example 3 was about ⅓ of that of the Comparative Example.

The average diameter of the bulk fibers of Examples 1, 2 and 3 was substantially the same as that of the Comparative example. The volume of the shot being 65 mesh or more, contained in the bulk fibers of Examples 1, 2 and 3 was about ½ of that of the Comparative Example. In, Examples 1, 2 and 3, it was remarkably decreased. Also, the volume of shot being 65 mesh or less contained in the bulk fibers of Examples 1, 2 and 3 as smaller than that of the Comparative Example. It was observed that the total volumes of the shot in each of the Examples 1, 2 and 3 was smaller than that of the Comparative Example and the volumes of the shot having large sizes in each of the Examples 1, 2 and 3, was smaller than that of the Comparative Example.

In Examples 1 and 2, no dust problems occurred with respect to the fine fibers. Thus, it was not necessary to use a dust catcher, so that the space used for equipment arrangement could be small. In the Comparative Example, a dust problem occured.

According to this invention, a small amount of liquid can produce bulk fibers in such a manner that they contain a small quantity of shot. Therefore, the volume of proper fibers produced per a material unit are large. In addition, shot contained in the fibers are small in size resulting in a smooth feeling.

The consumed energy for producing fibers is small because the fibers are produced by the liquid jet. The volume of liquid can be samll. Thus, the energy efficiency is high.

The liquid jet does not induce any substantial ambient air into the collecting means. Thus, only a small collecting space is needed. As no dust problems occur, the atmosphere can be kept clean.

Also, the fibers can be stored together with the liquid. It is easy to treat a large volume of fibers for a limited period of time, for example, during the steps of separating shot from them, dehydrating them and drying them.

TABLE 1

|  | Example 1 | Example 2 |
|---|---|---|
| Jet | water | water |
| Engine Power of Compressor | 150 horsepower | 150 horsepower |
| Working Pressure of Compressor | 700 kgf/cm$^2$ | 700 kgf/cm$^2$ |
| Capacity of Compressor | 72 l/min. | 72 l/min. |
| Engine Output in operating | 16% 24 horsepower | 4% 6.1 horsepower |
| Average Pressure in operating | 500 kgf/cm$^2$ | 200 kgf/cm$^2$ |
| Average Flow Rate in operating | 13.3 l/min. | 16.9 l/min. |
| Energy for making fibers | 0.12 kwh/kg | 0.06 kwh/kg |
| Average Diameter of fibers | 3.5 microns | 3.8 microns |
| Volume of shot being 65 mesh or more | 7.4% | 8.7% |
| Volume of shot being 65 mesh of less | 33.5% | 34.3% |

TABLE 2

|  | Example 3 | Compar. Example |
|---|---|---|
| Jet | water | air |
| Engine Power of Compressor | 150 horsepower | 190 horsepower |
| Working Pressure of Compressor | 700 kgf/cm$^2$ | 7 kgf/cm$^2$ |
| Capacity of Compressor | 72 l/min. | 19 l/min. |
| Engine Output in operating | 27% 40 horsepower | 75% 142.5 horsepower |
| Average Pressure in operating | 700 kgf/cm$^2$ | 5.2 kgf/cm$^2$ |
| Average Flow Rate in operating | 29.6 l/min. | 19 m$^3$/min. |
| Energy for making fibers | 0.2 kwh/kg | 0.7 kwh/kg |
| Average Diameter of fibers | 3.3 microns | 3.2 microns |
| Volume of shot being 65 mesh or more | 11.1% | 19.6% |
| Volume of shot being 65 mesh or less | 36.1% | 39.7% |

What is claimed is:

1. A method for producing fibers, comprising the steps of fusing a fiber material, consisting essentially of either $Al_2O_3$—$SiO_2$ ceramic or $Al_2O_3$—$SiO_2$—$C_2O_3$ ceramic, so as to obtain a molten fiber material, forming a flow of said molten fiber material, and applying a liquid jet onto the flow of said molten fiber material so as to produce a plurality of fibers.

2. A method as defined in claim 1 wherein said flow of said molten fiber material is cut by said liquid jet being set at an inclined angle in respect to the direction of flow of said molten fiber material.

3. A method as defined in claim 2 wherein said liquid jet is formed by a single nozzle so as to cut said flow of said molten fiber material while it moves downwardly in a vertical direction.

4. A method as defined in claim 3 wherein said inclined angle ranges from 10 degrees to 90 degrees in respect to the axis of said nozzle.

5. A method as defined in claim 2 wherein said liquid jet is formed by a plurality of nozzles in such a manner that plural liquid jets cut the flow of said molten fiber material.

6. A method as defined in claim 5 wherein said inclined angle ranges from 30 degrees to 60 degrees between each axis of said nozzles.

7. A method as defined in claim 2 wherein said molten fiber material flows vertically downwardly at a flow rate of 75 to 500 kg/hr.

8. A method as defined in claim 2 wherein said liquid jet has an average liquid pressure of 100 to 2,000 kgf/cm$^2$ and an average flow velocity of 15 to 100 l/min.

9. A method as defined in claim 2 wherein the energy required for producing said fibers by said liquid jet ranges from 0.05 kwh/kg to 0.5 kwh/kg.

10. A method as defined in claim 2 wherein said molten fiber material comprises an $Al_2O_3$—$SiO_2$ ceramic fiber composition containing $Al_2O_3$, 35 to 65 wt %, $SiO_2$, 30 to 60 wt %, and minor impurities.

11. A method defined in claim 2 wherein said molten fiber material comprises an $Al_2O_3$—$SiO_2$—$Cr_2O_3$ ceramic fiber composition containing $Al_2O_3$, 35 to 65 wt %, $SiO_2$, 30 to 60 wt %, $Cr_2O_3$, 1 to 6 wt %, and minor impurities.

12. A method as defined in claim 5 wherein said plurality of nozzles comprises at least three round-jet water jet nozzles arranged in such a manner that said round-jet water jet nozzles produce at least three water jets cutting said flow of said molten fiber material at an inclined angle, and wherein each of said at least three water jets is a tangent which touches an outer surface of said flow of said molten fiber material.

13. A method as defined in claim 12 wherein, until said at least three water jets cut said flow of said molten fiber material so as to produce a plurality of fibers, said at least three water jets flow without significant diverging phenomena.

14. An apparatus for producing fibers, comprising means for thermally fusing a fiber material, consisting essentially of either $Al_2O_3$—$SiO_2$ ceramic or $Al_2O_3$—$SiO_2$—$Cr_2O_3$ ceramic, so as to obtain molten fiber material, means for discharging said molten fiber material as a continuous flow thereof, and liquid jet means for applying liquid pressure to said flow so as to produce a plurality of fibers, wherein said liquid jet means comprises at least three round-jet type water jet nozzles arranged in such a manner that said at least three water jet nozzles produce at least three water jets cutting said flow of said molten fiber material at an inclined angle.

15. An apparatus as defined in claim 14 further comprising means for collecting said fibers and said liquid.

* * * * *